United States Patent
Rittner et al.

(10) Patent No.: US 6,955,713 B2
(45) Date of Patent: Oct. 18, 2005

(54) DEVICE FOR ENRICHING AIR WITH OXYGEN

(75) Inventors: Wolfgang Rittner, Siblin (DE); Rüdiger Meckes, Berkenthin (DE)

(73) Assignee: Dräger Aerospace GmbH, Lübeck (DE)

( * ) Notice: Subject to any disclaimer, the term of this patent is extended or adjusted under 35 U.S.C. 154(b) by 30 days.

(21) Appl. No.: 10/454,161

(22) Filed: Jun. 4, 2003

(65) Prior Publication Data

US 2004/0060446 A1 Apr. 1, 2004

(30) Foreign Application Priority Data

Sep. 26, 2002 (DE) .......................................... 102 45 042

(51) Int. Cl.⁷ ............................................. B01D 53/047
(52) U.S. Cl. .............................. 96/136; 96/130; 96/139; 96/140; 96/142; 55/459.1; 55/462
(58) Field of Search ................................ 95/34, 39, 41, 95/117, 118, 121, 130; 96/108, 128, 130, 139, 134–136, 140, 142; 55/459.1, 462

(56) References Cited

U.S. PATENT DOCUMENTS

| | | | |
|---|---|---|---|
| 3,527,027 A | * | 9/1970 | Knight et al. ................. 96/134 |
| 4,097,248 A | | 6/1978 | Frantz |
| 4,113,451 A | | 9/1978 | Frantz |
| 4,673,415 A | * | 6/1987 | Stanford ........................ 95/19 |
| 4,681,602 A | * | 7/1987 | Glenn et al. .................... 95/47 |
| 5,409,514 A | * | 4/1995 | Ragusa et al. ................. 55/319 |
| 5,429,662 A | * | 7/1995 | Fillet ............................. 95/14 |
| 5,665,143 A | | 9/1997 | Jarvis et al. |
| 5,678,403 A | | 10/1997 | Kanehara et al. |
| 5,711,787 A | * | 1/1998 | Neill et al. .................... 95/96 |
| 5,871,564 A | * | 2/1999 | McCombs ..................... 95/98 |
| 5,968,231 A | | 10/1999 | Paramentier et al. |
| 6,019,822 A | * | 2/2000 | Kanzawa et al. ................ 96/8 |
| 6,171,356 B1 | * | 1/2001 | Twerdun ...................... 55/337 |
| 6,171,370 B1 | * | 1/2001 | Hirano et al. .................. 95/96 |
| 6,200,361 B1 | | 3/2001 | Krymsky |
| 6,251,164 B1 | * | 6/2001 | Notaro et al. .................. 95/99 |
| 6,315,814 B1 | * | 11/2001 | Barry et al. .................... 95/24 |
| 6,660,065 B2 | * | 12/2003 | Byrd et al. ................... 95/117 |
| 6,726,752 B2 | * | 4/2004 | Chen .......................... 96/190 |
| 2002/0029691 A1 | * | 3/2002 | McCombs et al. ............. 95/96 |

FOREIGN PATENT DOCUMENTS

| | | |
|---|---|---|
| EP | 0 135 936 | 4/1985 |
| EP | 0 358 915 | 3/1990 |
| EP | 0 586 018 A1 | 3/1994 |
| FR | 2 785 828 | 5/2000 |
| GB | 683496 | 11/1952 |
| GB | 2 090 160 A | 7/1982 |
| JP | 08109824 A | 4/1996 |
| WO | WO 95/11740 | 5/1995 |

* cited by examiner

*Primary Examiner*—Robert H. Spitzer
(74) *Attorney, Agent, or Firm*—McGlew and Tuttle, P.C.

(57) ABSTRACT

A device for enriching air with oxygen by pressure swing adsorption in a molecular sieve bed provides for the separation of water from the air to be enriched with oxygen. The water separator is arranged directly upstream of the molecular sieve bed (8). The water separator is designed as a cyclone type water separator (5).

17 Claims, 2 Drawing Sheets

DEVICE FOR ENRICHING AIR WITH OXYGEN

FIELD OF THE INVENTION

The present invention pertains to a device for enriching air with oxygen by means of pressure swing adsorption in molecular sieve beds with at least one water separator between a compressed air source and the molecular sieve beds.

BACKGROUND OF THE INVENTION

The adsorptive separation of gas mixtures by means of pressure swing adsorption was developed for a very great variety of separation processes. All separation processes are based on the fact that the percentage of gas in the gas mixture that has a higher affinity for the adsorbent is fixed in an adsorption step on the surface of the adsorbent and the less strongly adsorbed component can be removed from the adsorber packed with the adsorbent. The desorption of the adsorbed phase is achieved by reducing the pressure after the adsorption step and by flushing the adsorbent with part of the enriched gas.

A device for enriching air with oxygen has become known from EP 135 936 A2. In the prior-art device, the air drawn in by a compressor is first cooled in a cooler to a temperature close to the ambient temperature and water of condensation is separated in the process. The air then reaches an adsorption bed, which comprises a first layer for separating water vapor and carbon dioxide and a second layer consisting of an X type molecular sieve for the adsorption of nitrogen. To separate the nitrogen, the air that is under the working pressure is first admitted to the adsorption bed, and the product gas obtained is stored intermediately in a tank. The pressure is lowered to a mean value below the working pressure. The residual pressure left is lowered to ambient pressure level during the subsequent desorption of the water vapor and the nitrogen, and the flush gas is drawn off into the environment via the feed point of the adsorption bed. To support the phase of desorption, the adsorption bed may be additionally flushed with the product gas.

The drawback of the prior-art device is that the moisture cannot be removed completely from the first layer of the adsorption bed if the flush gas flow is too low. However, increasing the flush gas flow leads to a no longer acceptable loss of product gas and consequently to low efficiency of the plant.

SUMMARY OF THE INVENTION

The basic object of the present invention is to improve a device of the mentioned type in terms of the separation of water from the air to be enriched with oxygen.

According to the invention, a device for enriching air with oxygen by means of pressure swing adsorption in molecular sieve beds is provided with at least one water separator between a compressed air source and the molecular sieve beds. The water separator is arranged directly upstream of the molecular sieve beds and is designed as a cyclone type water separator.

The advantage of the present invention is essentially that due to the separation of water by means of a cyclone type water separator, high separation efficiency is reached without the water separator having to be regenerated by a flush gas flow, as it would be necessary in the case of a molecular sieve according to the state of the art. The water separated may be drawn off directly in the case of the cyclone type water separator. Another advantage is that dirt particles are also removed due to the action of the centrifugal force. Due to the combination of the cyclone type water separator with a very fine filter, which retains very fine dirt particles, the air to be enriched with oxygen can be processed such that the molecular sieve, with which the nitrogen adsorption is carried out, is contaminated only to a very low extent.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
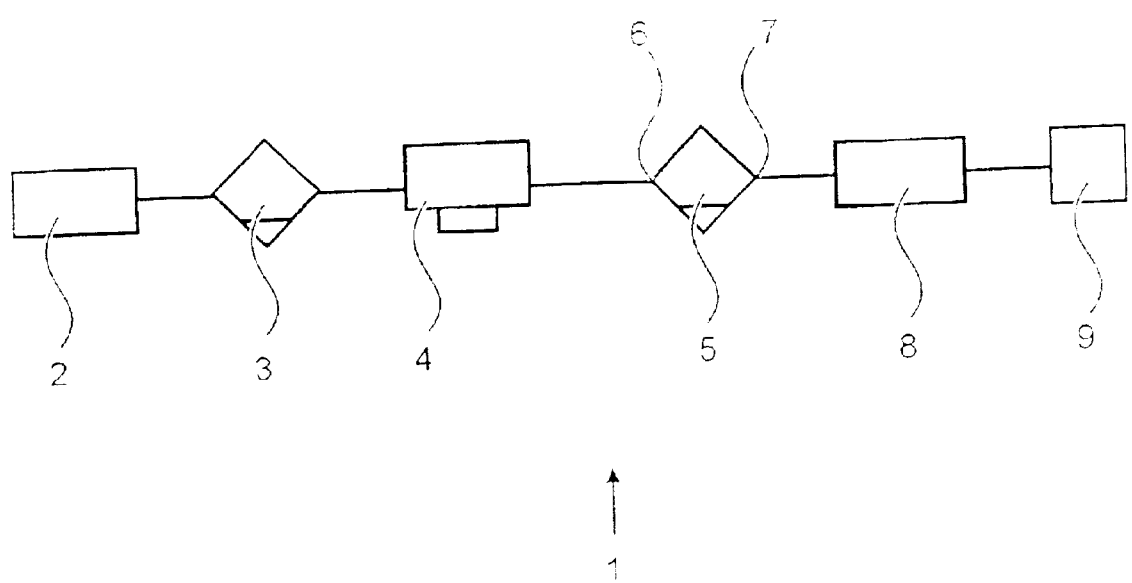
FIG. 1 is a view showing a device for enriching air with oxygen according to the invention.

Referring to the drawings in particular, FIG. 1 schematically shows a device 1 for enriching air with oxygen. The device 1 is used to supply breathing gas in an airplane, not shown specifically in FIG. 1.

The air leaving a pressurized source 2, e.g., a turbine, enters a pressure reducer 4 via a water separator 3. The pressure reducer 4 reduces the pressure to a working pressure of about 2 bar. A cyclone type water separator 5 is provided downstream of the pressure reducer 4. The water separator 5 has a gas inlet 6 and a gas outlet 7. The water separator 5 is located after the pressure reducer to condition the air flow before the air reaches a molecular sieve bed 8. In the molecular sieve bed 8 the oxygen is adsorbed in the known manner. The product gas enriched with oxygen proceeds out of molecular sieve bed 8 and is temporarily stored in a tank 9 before it reaches a user, not shown in FIG. 1.

Figure 2:
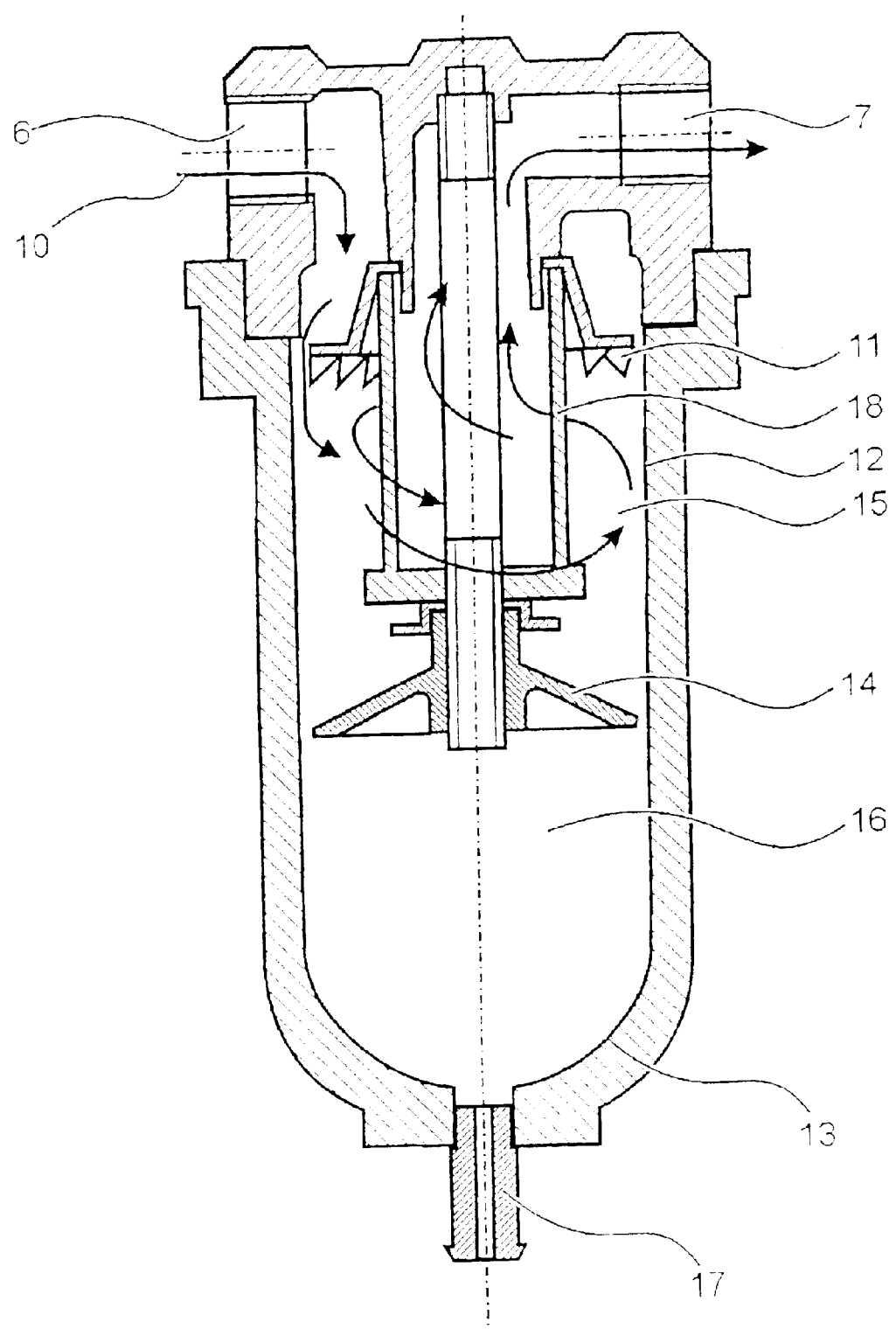
FIG. 2 is a schematic sectional view showing the longitudinal section of a cyclone type water separator according to the invention.

FIG. 2 illustrates the design of the cyclone type water separator 5 according to FIG. 1 in a longitudinal section. The compressed air entering via the gas inlet 6, indicated by the arrow 10, is forced to move on a centrifugal path by means of a swirl flap 11. Water and dirt particles are thrown against an inner wall 12 by the action of the centrifugal force and reach a housing bottom 13. A separating disk 14 in the interior space of the water separator 5 brings about the separation into a vortex zone 15 and a calming zone 16. Separated condensate is prevented by the zones 15, 16 from entering the air flow again. The condensate is removed via a drain valve 17. The air subsequently flows via a filter element 18 to the gas outlet 7. The filter element 18 is dimensioned with a pore size of 1 $\mu$m such that a sufficient degree of purity of the air is reached for the subsequent further treatment in the molecular sieve bed 8 without an excessively great pressure loss occurring.

While a specific embodiment of the invention has been shown and described in detail to illustrate the application of the principles of the invention, it will be understood that the invention may be embodied otherwise without departing from such principles.

What is claimed is:

1. A device for enriching air with oxygen by way of pressure swing adsorption, the device comprising:
    a turbine;
    a first group of air exiting from said turbine;
    at least one water separator located downstream of said turbine;
    a pressure reducer located downstream of said water separator;
    a second group of air exiting from said pressure reducer;
    a further water separator located downstream from said pressure reducer; and
    one or more molecular sieve beds located downstream of said further water separator, wherein said first group of air exiting from said turbine is directed through said water separator to said pressure reducer, and said second group of air exiting from said pressure reducer is directed through said further water separator to said molecular sieve bed.

2. A device according to claim 1, wherein said further water separator is a cyclone water separator.

3. A device according to claim 2, wherein said cyclone water separator includes a housing with an inner wall, a compressed air inlet opening into a swirl zone, a swirl flap forcing air to move in a centrifugal path and forcing water and dirt particles against said inner wall by the action of the centrifugal force and with an outlet.

4. A device according to claim 3, wherein said cyclone water separator further includes a filter separating said inlet and said outlet.

5. A device according to claim 2, wherein said cyclone water separator further includes a separating disk in said housing separating an interior into a swirl zone and a calming zone, whereby separated condensate is prevented by the swirl zone and calming zone from entering the air flow again.

6. A device according to claim 5, wherein said cyclone water separator further includes:
    a drain valve at a bottom of said interior of said housing.

7. A device according to claim 1, wherein said turbine is a gas turbine.

8. A device according to claim 1, wherein:
    said one or more molecular sieve beds enriches air with oxygen means of pressure swing adsorption.

9. A device for enriching air, the device comprising:
    a compressed sir source;
    a first water separator connected to said compressed air source and receiving compressed air from said compressed air source;
    a pressure reducer connected to said first water separator and receiving compressed air from said first water separator;
    a second water separator connected to said pressure reducer and receiving reduced pressure air from said pressure reducer;
    a molecular sieve connected to said second water separator and receiving air from said second water separator.

10. A device according to claim 9, wherein:
    said compressed air source is a turbine of an airplane;
    said molecular sieve supplies breathing gas to the airplane.

11. A device according to claim 10, wherein said turbine is a gas turbine.

12. A device according to claim 9, wherein said second water separator is a cyclone water separator.

13. A device according to claim 12, wherein said cyclone water separator includes a housing with an inner wall, a compressed air inlet opening into a swirl zone, a swirl flap forcing air to move in a centrifugal path and forcing water and dirt particles against said inner wall by centrifugal force, and an outlet.

14. A device according to claim 13, wherein said cyclone water separator further includes a filter separating said inlet and said outlet.

15. A device according to claim 14, wherein said cyclone water separator further includes a separating disk in said housing separating an interior into said swirl zone and a calming zone, said separating disk preventing separated condensate from entering an air flow.

16. A device according to claim 15, wherein said cyclone water separator further includes:
    a drain valve at a bottom of said interior of said housing.

17. A device according to claim 9, wherein:
    said molecular sieve device enriches air with oxygen by means of pressure swing adsorption.

* * * * *